(12) United States Patent  
Lemmer et al.

(10) Patent No.: US 8,834,976 B2
(45) Date of Patent: Sep. 16, 2014

(54) ARTICLES INCLUDING ANTICONDENSATION AND/OR LOW-E COATINGS AND/OR METHODS OF MAKING THE SAME

(75) Inventors: Jean-Marc Lemmer, Ann Arbor, MI (US); Nestor P. Murphy, West Bloomfield, MI (US); David D. McLean, Royal Oak, MI (US); Richard Blacker, Farmington Hills, MI (US); Herbert Lage, Luxembourg (LU); Jose Ferreira, Rumelange (LU); Pierre Pallotta, Villerupt (FR)

(73) Assignees: Guardian Industries Corp., Auburn Hills, MI (US); Centre Luxembourgeois de Recherches pour le Verre et al Ceramique S.A. (C.R.V.C.), Grand Duche de Luxembourg ( * ) Notice: Subject to any disclaimer, the term of this patent is extended or adjusted under 35 U.S.C. 154(b) by 356 days.

(21) Appl. No.: 13/333,183

(22) Filed: Dec. 21, 2011

(65) Prior Publication Data

US 2012/0164420 A1    Jun. 28, 2012

Related U.S. Application Data

(63) Continuation-in-part of application No. 12/926,714, filed on Dec. 6, 2010, which is a continuation-in-part of application No. 12/923,082, filed on Aug. 31, 2010, and a continuation-in-part of application No. 12/662,894, filed on May 10, 2010, which is a continuation-in-part of application No. 12/659,196, filed on Feb. 26, 2010.

(51) Int. Cl.
| | | |
|---|---|---|
| *C03C 17/23* | (2006.01) | |
| *C03C 17/34* | (2006.01) | |
| *C03C 17/36* | (2006.01) | |
| *F25D 23/02* | (2006.01) | |
| *E04D 13/03* | (2006.01) | |
| *E06B 3/66* | (2006.01) | |

(52) U.S. Cl.
CPC ............ *E06B 3/66* (2013.01); *C03C 2217/231* (2013.01); *C03C 2217/256* (2013.01); *C03C 2217/212* (2013.01); *C03C 2217/216* (2013.01); *C03C 2217/211* (2013.01); *C03C 2217/27* (2013.01); *C03C 2217/261* (2013.01); *C03C 2217/26* (2013.01); *F25D 23/02* (2013.01); *E04D 13/033* (2013.01); *C03C 17/3435* (2013.01); *C03C 17/3644* (2013.01); *C03C 17/366* (2013.01); *C03C 2217/948* (2013.01); *C03C 2218/365* (2013.01); *C03C 17/36* (2013.01); *C03C 17/3618* (2013.01); *C03C 17/3626* (2013.01); *C03C 17/3681* (2013.01); *C03C 2217/70* (2013.01)
USPC .............. 428/34; 428/428; 428/434; 428/216

(58) Field of Classification Search
None
See application file for complete search history.

(56) References Cited

U.S. PATENT DOCUMENTS

| | | | |
|---|---|---|---|
| 4,910,088 A | 3/1990 | Baudin et al. | |
| 5,093,207 A | 3/1992 | Hodes et al. | |
| 5,342,676 A * | 8/1994 | Zagdoun | 428/216 |
| 5,344,718 A | 9/1994 | Hartig et al. | |
| 5,376,455 A | 12/1994 | Hartig et al. | |
| 5,514,476 A | 5/1996 | Hartig et al. | |
| 5,520,996 A * | 5/1996 | Balian et al. | 428/216 |
| 5,557,462 A | 9/1996 | Hartig et al. | |
| 5,584,902 A | 12/1996 | Hartig et al. | |
| 5,657,607 A | 8/1997 | Collins et al. | |
| 5,664,395 A | 9/1997 | Collins et al. | |
| 5,770,321 A | 6/1998 | Hartig et al. | |
| 5,776,594 A * | 7/1998 | Austin | 428/212 |
| 5,784,853 A | 7/1998 | Hood et al. | |
| 5,800,933 A | 9/1998 | Hartig et al. | |
| 5,902,652 A | 5/1999 | Collins et al. | |
| 6,014,872 A | 1/2000 | Hartig et al. | |
| 6,042,752 A | 3/2000 | Mitsui | |
| 6,052,965 A | 4/2000 | Florentin et al. | |
| 6,059,909 A | 5/2000 | Hartig et al. | |
| 6,144,017 A | 11/2000 | Millett et al. | |

| | | | |
|---|---|---|---|
| 6,174,599 B1 * | 1/2001 | Boire et al. ............... 428/336 |
| 6,606,833 B2 | 8/2003 | Richardson et al. |
| 6,632,491 B1 | 10/2003 | Thomsen et al. |
| 6,635,321 B2 | 10/2003 | Wang et al. |
| 6,641,689 B1 | 11/2003 | Aggas |
| 6,686,050 B2 | 2/2004 | Lingle et al. |
| 6,701,749 B2 | 3/2004 | Wang et al. |
| 6,802,943 B2 | 10/2004 | Stachowiak |
| 6,818,309 B1 | 11/2004 | Talpaert et al. |
| 6,830,817 B2 | 12/2004 | Stachowiak |
| 6,916,408 B2 | 7/2005 | Laird et al. |
| 7,166,359 B2 | 1/2007 | Kriltz et al. |
| 7,189,458 B2 | 3/2007 | Ferreira et al. |
| 7,198,851 B2 | 4/2007 | Lemmer et al. |
| 7,419,725 B2 | 9/2008 | Neuman et al. |
| 7,455,910 B2 | 11/2008 | Stachowiak |
| 7,521,096 B2 | 4/2009 | Lemmer et al. |
| 7,648,769 B2 | 1/2010 | Blacker et al. |
| 7,767,306 B2 | 8/2010 | Veerasamy |
| 7,771,571 B2 | 8/2010 | Laird et al. |
| 7,858,191 B2 | 12/2010 | Lemmer et al. |
| 7,964,284 B2 | 6/2011 | Blacker et al. |
| 8,017,243 B2 | 9/2011 | Blacker et al. |
| 8,025,941 B2 | 9/2011 | Taylor et al. |
| 8,254,337 B2 * | 8/2012 | Zhong et al. ............... 370/332 |
| 2001/0041252 A1 | 11/2001 | Laird |
| 2002/0031674 A1 | 3/2002 | Laird |
| 2003/0179343 A1 * | 9/2003 | Marechal et al. ......... 351/159 |
| 2004/0160171 A1 * | 8/2004 | Takahashi ............... 313/504 |
| 2006/0099428 A1 | 5/2006 | Butz et al. |
| 2007/0036986 A1 | 2/2007 | Chonlamaitri et al. |
| 2007/0036990 A1 | 2/2007 | Dietrich et al. |
| 2007/0128449 A1 | 6/2007 | Taylor et al. |
| 2007/0128451 A1 | 6/2007 | Ferreira et al. |
| 2008/0008829 A1 | 1/2008 | Blacker et al. |
| 2009/0104385 A1 * | 4/2009 | Reymond et al. ............ 428/34 |
| 2009/0205956 A1 | 8/2009 | Lu et al. |
| 2009/0324967 A1 | 12/2009 | Disteldorf et al. |
| 2010/0071810 A1 | 3/2010 | Nadaud et al. |
| 2010/0075155 A1 | 3/2010 | Veerasamy |
| 2010/0279144 A1 | 11/2010 | Frank et al. |
| 2010/0295330 A1 | 11/2010 | Ferreira et al. |
| 2011/0097590 A1 | 4/2011 | Lemmer et al. |
| 2011/0117371 A1 | 5/2011 | Nunez-Regueiro et al. |
| 2011/0210656 A1 | 9/2011 | Lemmer et al. |
| 2011/0212279 A1 | 9/2011 | Lemmer et al. |
| 2011/0212311 A1 | 9/2011 | Lemmer et al. |
| 2011/0262726 A1 | 10/2011 | Knoll et al. |
| 2012/0021149 A1 * | 1/2012 | Myli et al. ............... 428/34 |

FOREIGN PATENT DOCUMENTS

| | | |
|---|---|---|
| EP | 0 634 376 | 1/1995 |
| EP | 0 646 660 | 4/1995 |
| EP | 0 676 379 | 10/1995 |
| EP | 0 719 876 | 7/1996 |
| GB | 2 031 756 | 4/1980 |
| JP | 07-114841 | 5/1995 |
| WO | WO 95/13189 | 5/1995 |
| WO | WO 2011/105991 | 9/2001 |
| WO | WO 2006/020753 | 2/2006 |

OTHER PUBLICATIONS

U.S. Appl. No. 12/923,082, filed Aug. 31, 2010; McLean et al.
U.S. Appl. No. 13/064,066, filed Mar. 3, 2011; Frank et al.
U.S. Appl. No. 13/183,833, filed Jul. 15, 2011; Benito et al.
U.S. Appl. No. 13/317,176, filed Oct. 12, 2011; O'Connor et al.
U.S. Appl. No. 13/324,267, filed Dec. 13, 2011; Frank et al.
U.S. Appl. No. 13/333,069, filed Dec. 21, 2011; Lage et al.
U.S. Appl. No. 12/385,234, filed Aug. 8, 2009; Lemmer.
U.S. Appl. No. 12/385,802, filed Aug. 20, 2009; Lu et al.
U.S. Appl. No. 12/461,792, filed Dec. 31, 2009; Blacker et al.
U.S. Appl. No. 12/591,611, filed Nov. 25, 2009; Veerasamy.
U.S. Appl. No. 12/654,594, filed Dec. 23, 2009; Blacker.
U.S. Appl. No. 12/457,006, filed May 28, 2010; Broadway et al.
"Homogeneously Aligned Liquid Crystal Display on Silicon Oxynitride Thin Film Using Ion Beam Bombardment"; Oh et al., Materials Chemistry and Physics 117 (2009) pp. 355-358.
"A Full Description of a Simple and Scalable Fabrication Process for Electrowetting Displays", Zhou et al., Journal of Micromechanics and Microengineering 19, (2009) pp. 1-12.

* cited by examiner

*Primary Examiner* — David Sample
(74) *Attorney, Agent, or Firm* — Nixon & Vanderhye P.C.

(57) ABSTRACT

Certain example embodiments of this invention relate to articles including anticondensation and/or low-E coatings that are exposed to an external environment, and/or methods of making the same. In certain example embodiments, the anticondensation and/or low-E coatings may be survivable in an outside environment. The coatings also may have a sufficiently low sheet resistance and hemispherical emissivity such that the glass surface is more likely to retain heat from the interior area, thereby reducing (and sometimes completely eliminating) the presence condensation thereon. The articles of certain example embodiments may be, for example, skylights, vehicle windows or windshields, IG units, VIG units, refrigerator/freezer doors, and/or the like.

14 Claims, 5 Drawing Sheets

ARTICLES INCLUDING ANTICONDENSATION AND/OR LOW-E COATINGS AND/OR METHODS OF MAKING THE SAME

This application is a Continuation-in-Part (CIP) of U.S. patent application Ser. No. 12/926,714, filed Dec. 6, 2010, which is a CIP of U.S. patent application Ser. No. 12/923,082, filed Aug. 31, 2010, and Ser. No. 12/662,894, filed May /10/2010, the latter of which is a CIP of Ser. No. 12/659,196, filed Feb. 26, 2010, the disclosure of each of which are hereby incorporated herein by reference.

FIELD OF THE INVENTION

Certain example embodiments of this invention relate to articles including anticondensation and/or low-E coatings, and/or methods of making the same. More particularly, certain example embodiments of this invention relate to articles including anticondensation and/or low-E coatings that are exposed to an external environment, and/or methods of making the same. In certain example embodiments, the anticondensation and/or low-E coatings may be survivable in an outside environment and also may have a low hemispherical emissivity such that the glass surface is more likely to retain heat from the interior area, thereby reducing (and sometimes completely eliminating) the presence condensation thereon. The articles of certain example embodiments may be, for example, skylights, vehicle windows or windshields, IG units, VIG units, refrigerator/freezer doors, and/or the like.

BACKGROUND AND SUMMARY OF EXAMPLE EMBODIMENTS OF THE INVENTION

Moisture is known to condense on skylights, refrigerator/freezer doors, vehicle windows, and other glass products. Condensation buildup on skylights detracts from the aesthetic appeal of the lite. Similarly, condensation buildup on refrigerator/freezer doors in supermarkets or the like sometimes makes it difficult for shoppers to quickly and easily pinpoint the products that they are looking for. And condensation buildup on automobiles often is an annoyance in the morning, as a driver oftentimes must scrape frost or ice and/or actuate the vehicle's defroster and/or windshield wipers to make it safer to drive. Moisture and fog on the windshield oftentimes presents a similar annoyance, although they may also pose potentially more significant safety hazards as a driver traverses hilly areas, as sudden temperature drops occur, etc.

Various anticondensation products have been developed over the years to address these and/or other concerns in a variety of applications. See, for example, U.S. Pat. Nos. 6,818,309; 6,606,833; 6,144,017; 6,052,965; 4,910,088, the entire contents of each of which are hereby incorporated herein by reference. As alluded to above, certain approaches use active heating elements to reduce the buildup of condensation, for example, as in vehicle defrosters, actively heated refrigerator/freezer doors, etc. These active solutions unfortunately take time to work in the vehicle context and thus address the problem once it has occurred. In the case of refrigerator/freezer doors, such active solutions may be expensive and/or energy inefficient.

Some attempts have been made to incorporate a thin-film anticondensation coating on a window. These attempts generally have involved pyrolitically depositing a 4000-6000 angstrom thick fluorine-doped tin oxide (FTO) coating on the exterior surface (e.g., surface 1) of a window such as, for example, a skylight. Although pyrolytic deposition techniques are known to present "hard coatings," the FTO unfortunately scratches fairly easily, changes color over time, and suffers from other disadvantages.

Thus, it will be appreciated there is a need in the art for articles including improved thin-film anticondensation and/or low-E coatings, and/or methods of making the same.

One aspect of certain example embodiments relates to anticondensation and/or low-E coatings that are suitable for exposure to an external environment, and/or methods of making the same. The external environment in certain example instances may be the outside and/or the inside of a vehicle or house (as opposed to, for example, a more protected area between adjacent substrates).

Another aspect of certain example embodiments relates to anticondensation and/or low-E coatings that have a low sheet resistance and a low hemispherical emissivity such that the glass surface is more likely to retain heat from the interior area, thereby reducing (and sometimes completely eliminating) the presence condensation thereon.

Still another aspect of certain example embodiments relates to coated articles having an anticondensation and/or low-E coating formed on an outer surface and one or more low-E coatings formed on one or more respective interior surfaces of the article. In certain example embodiments, the anticondensation coating may be thermally tempered (e.g., at a temperature of at least 580 degrees C. for at least about 2 minutes, more preferably at least about 5 minutes) or annealed (e.g., at a temperature lower than that required for tempering).

The articles of certain example embodiments may be, for example, skylights, vehicle windows or windshields, IG units, VIG units, refrigerator/freezer doors, and/or the like.

Certain example embodiments of this invention relate to a skylight comprising: first and second substantially parallel, spaced apart glass substrates; a plurality of spacers arranged to help maintain the first and second substrates in substantially parallel, spaced apart relation to one another; an edge seal sealing together the first and second substrates; and an anticondensation coating provided on an exterior surface of the first substrate exposed to an environment external to the skylight, the anticondensation coating comprising the following layers moving away from the first substrate: a layer comprising silicon nitride and/or silicon oxynitride, a layer comprising a transparent conductive oxide (TCO), a layer comprising silicon nitride, and a layer comprising at least one of zirconium oxide, zirconium nitride, aluminum oxide, and aluminum nitride, wherein the anticondensation coating has a hemispherical emissivity of less than less than 0,23 and a sheet resistance of less than 30 ohms/square. The TCO may be of or including ITO or the like in certain example embodiments of this invention.

Certain example embodiments of this invention relate to a skylight. First and second substantially parallel, spaced apart glass substrates are provided. A plurality of spacers are arranged to help maintain the first and second substrates in substantially parallel, spaced apart relation to one another. An edge seal helps seal together the first and second substrates. An anticondensation coating is provided on an exterior surface of the first substrate exposed to an environment external to the skylight. The anticondensation coating comprises the following thin-film layers deposited in the following order moving away from the first substrate: a silicon-inclusive barrier layer, a first silicon-inclusive contact layer, a layer comprising a transparent conductive oxide (TCO), a second silicon-inclusive contact layer, and a layer of zirconium oxide.

The anticondensation coating has a hemispherical emissivity of less than less than 0.23 and a sheet resistance of less than 30 ohms/square.

Certain example embodiments of this invention relate to a coated article comprising: a coating supported by a substrate, wherein the coating is an anticondensation coating comprising the following layers moving away from the first substrate: a layer comprising silicon nitride and/or silicon oxynitride, a layer comprising a transparent conductive oxide (TCO), a layer comprising silicon nitride, and a layer comprising one or more of zirconium oxide, zirconium nitride, aluminum oxide, and aluminum nitride, wherein the anticondensation coating is disposed on an exterior surface of the substrate such that the anticondensation coating is exposed to an external environment, and the anticondensation coating has a hemispherical emissivity of less than less than 0.23 and a sheet resistance of less than 30 ohms/square.

Certain example embodiments of this invention relate to a coated article comprising a coating supported by a substrate. The coating is an anticondensation coating comprising the following thin-film layers deposited in the following order moving away from the first substrate: a silicon-inclusive barrier layer, a first silicon-inclusive contact layer, a layer comprising a transparent conductive oxide (TCO), a second silicon-inclusive contact layer, and a layer of zirconium oxide. The anticondensation coating is disposed on an exterior surface of the substrate such that the anticondensation coating is exposed to an external environment. The anticondensation coating has a hemispherical emissivity of less than less than 0.23 and a sheet resistance of less than 30 ohms/square.

According to certain example embodiments, the external environment is the inside of a house or vehicle. According to certain example embodiments, the external environment is the outside environment. According to certain example embodiments, a low-E coating is provided on the substrate opposite the anticondensation coating.

In certain example embodiments, the coated article may be built into a skylight, window, insulating glass (IG) window, vacuum insulating glass (VIG) window, refrigerator/freezer door, and/or vehicle window or windshield. The anticondensation coating may be provided on surface one and/or surface four of an IG or VIG unit, for example.

In certain example embodiments, a method of making an insulating glass unit (IGU) is provided. A first glass substrate is provided. A plurality of layers is disposed, directly or indirectly, on a first major surface of the first glass substrate, the plurality of layers including, in order moving away from the first glass substrate: a first layer comprising silicon oxynitride having an index of refraction of 1.5-2.1, a layer comprising ITO having an index of refraction of 1.7-2.1, and a second layer comprising silicon oxynitride having an index of refraction of 1.5-2.1. The first glass substrate is heat treated with the plurality of layers disposed thereon. A second glass substrate is provided in substantially parallel, spaced apart relation to the first glass substrate such that the first major surface of the first glass substrate faces away from the second glass substrate. The first and second glass substrates are sealed together.

According to certain example embodiments, the first and second layer comprising silicon oxynitride have indices of refraction of 1.7-1.8 and/or the layer comprising ITO has an index of refraction of 1.8-1.93.

According to certain example embodiments, said heat treating involves laser annealing, exposure to NIR-SWIR radiation, and/or furnace heating.

In certain example embodiments, a method of making an insulating glass unit (IGU) is provided. A first glass substrate is provided. A plurality of layers is disposed, directly or indirectly, on a first major surface of the first glass substrate, with the plurality of layers including, in order moving away from the first glass substrate: a first layer comprising silicon oxynitride, a layer comprising ITO, and a second layer comprising silicon oxynitride. The first glass substrate is heat treated with the plurality of layers disposed thereon. A second glass substrate is provided in substantially parallel, spaced apart relation to the first glass substrate such that the first major surface of the first glass substrate faces away from the second glass substrate. The first substrate with the plurality of layers on the first major surface of the first glass substrate has a hemispherical emissivity of less than or equal to about 0.20 and a sheet resistance less than or equal to about 20 ohms/square following said heat treating.

In certain example embodiments, an insulating glass unit (IGU) is provided. The IGU includes a first glass substrate. A plurality of layers is sputter-disposed, directly or indirectly, on a first major surface of the first glass substrate, the plurality of layers including, in order moving away from the first glass substrate: a first layer comprising silicon oxynitride having an index of refraction of 1.5-2.1, a layer comprising ITO having an index of refraction of 1.7-2.1, and a second layer comprising silicon oxynitride having an index of refraction of 1.5-2.1. A second glass substrate is provided in substantially parallel, spaced apart relation to the first glass substrate, with the first major surface of the first glass substrate facing away from the second glass substrate when assembled. An edge seal seals together the first and second glass substrates. The first glass substrate is heat treated with the plurality of layers disposed thereon. The first substrate with the plurality of layers on the first major surface of the first glass substrate has a hemispherical emissivity of less than or equal to about 0.20 and a sheet resistance less than or equal to about 20 ohms/square following said heat treating.

In certain example embodiments, an insulating glass (IG) unit is provided. First and second substantially parallel spaced apart glass substrates are provided, with the first and second substrates providing, in order, first through fourth substantially parallel major surfaces of the IG unit. A gap is defined between the first and second substrates. A fourth surface of the IG unit supports a first low-E coating comprising a plurality of thin film layers including, in order moving away from the second substrate: a first layer comprising silicon oxynitride having an index of refraction of 1.5-2.1 and being 50-90 nm thick, a layer comprising ITO having an index of refraction of 1.7-2.1 and being 85-125 nm thick, and a second layer comprising silicon oxynitride having an index of refraction of 1.5-2.1 and being 50-90 nm thick.

In certain example embodiments, there is provided a coated article comprising a substrate supporting first and second low-E coatings on opposing major surfaces thereof, respectively. The first low-E coating comprises, in order moving away from the substrate: a first layer comprising silicon oxynitride having an index of refraction of 1.5-2.1 and being 50-90 nm thick, a layer comprising ITO having an index of refraction of 1.7-2.1 and being 85-125 nm thick, and a second layer comprising silicon oxynitride having an index of refraction of 1.5-2.1 and being 50-90 nm thick. The second low-E coating comprises, in order moving away from the substrate: a first silicon-based layer, a first dielectric layer, a second dielectric layer split by a third dielectric layer so as to form first and second portions of the second dielectric layer, the third dielectric layer comprising either titanium oxide or tin oxide, a metallic or substantially metallic infrared (IR) reflecting layer over and directly contacting the second portion of the second dielectric layer, an upper contact layer comprising an oxide of Ni and/or Cr directly over and contacting the IR reflecting layer, a fourth dielectric layer, and a second silicon-based layer.

In certain example embodiments, a method of making an insulating glass unit (IGU) is provided. A first glass substrate is provided. A first low-E coating is disposed, directly or indirectly, on a first major surface of the first glass substrate. The first low-E coating comprises a plurality of thin film layers including, in order moving away from the first glass substrate: a first layer comprising silicon oxynitride, a layer comprising ITO, and a second layer comprising silicon oxynitride. A second glass substrate is provided in substantially parallel, spaced apart relation to the first glass substrate such that the first major surface of the first glass substrate faces away from the second glass substrate. The first substrate with only the first low-E coating thereon has a hemispherical emissivity of less than or equal to about 0.20 and a sheet resistance less than or equal to about 20 ohms/square following heat treatment. The first major surface of the first glass substrate corresponds to an interior surface of the IGU.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 1:
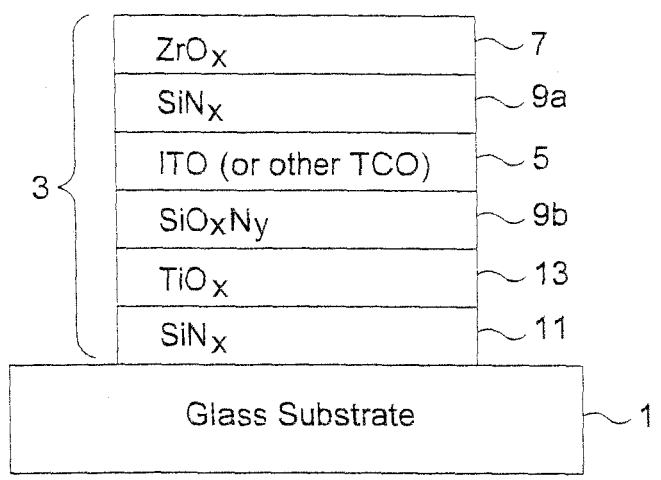
FIG. 1 is a coated article including an anticondensation coating in accordance with an example embodiment.

Referring now more particularly to the accompanying drawings in which like reference numerals indicate like parts in the several views.

Certain example embodiments of this invention relate to thin-film anticondensation coatings that are exposed to the environment. Such coatings have a low hemispherical emissivity in certain example embodiments, which helps the glass surface retain heat provided from the interior side. For instance, in skylight and/or other building window example applications, the glass surface retains more heat from the interior of the building. In vehicle example applications, the windshield retains more heat from the interior of the vehicle. This helps reduce (and sometimes even prevent) the initial formation of condensation. As alluded to above, such anticondensation coatings may be provided on a surface (or multiple surfaces) exposed to the environment in certain example instances. As such, the anticondensation coatings of certain example embodiments may be robust so as to be able to survive such conditions.

Figure 6:
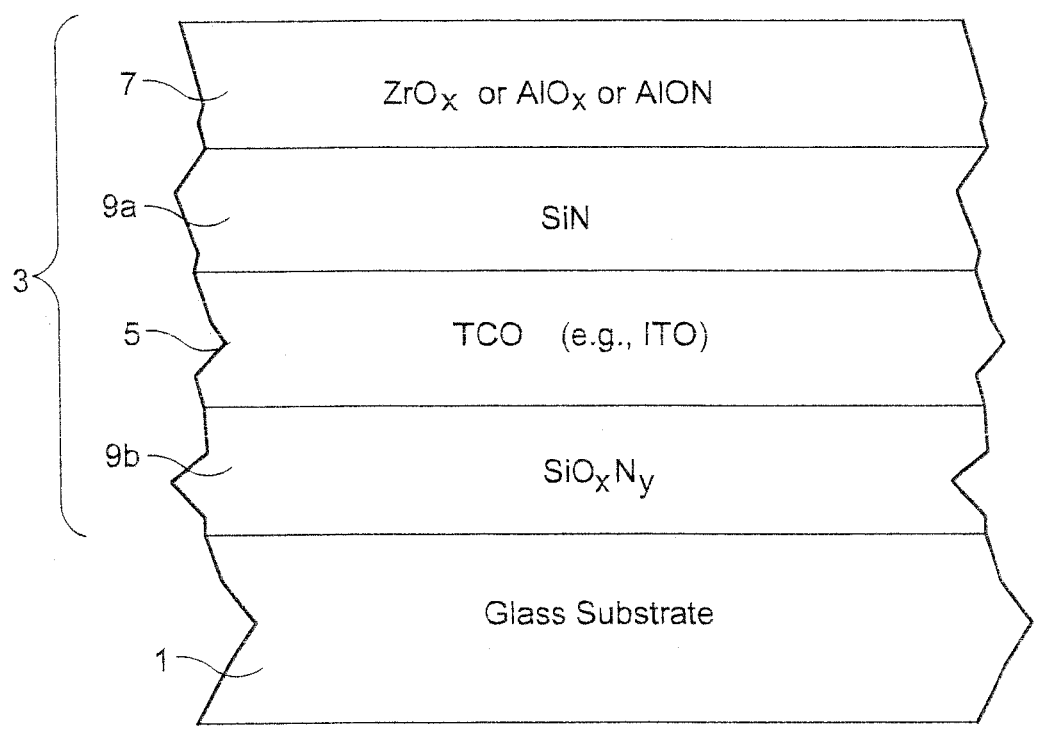
FIG. 6 is a coated article including an anticondensation coating in accordance with an example embodiment of this invention.

FIG. 1 is a coated article including an anticondensation coating in accordance with an example embodiment. The FIG. 1 example embodiment includes a glass substrate 1 supporting a multilayer thin-film anticondensation coating 3. The anticondensation coating 3 has a low hemispherical emissivity. In certain example embodiments, the hemispherical emissivity is less than 0.25, more preferably less than 0.23, still more preferably less than 0.2, and sometimes even less than 1.0-1.5. This is achieved by providing a thin transparent conductive oxide layer (TCO) 5 such that a suitably low sheet resistance is achieved. In the FIG. 1 example, the TCO 5 is indium tin oxide (ITO). A sheet resistance of the 10-30 ohms/square generally will be sufficient to achieve the desired hemispherical emissivity values. Certain example embodiments described herein provide a sheet resistance of 13-27 ohms/square, with the example provided below providing a sheet resistance of 17 ohms/square. In certain example instances, it is possible to select a TCO 5 such that the sheet resistance drops to as low as about 5 ohms/square, although this low value is not need in all embodiments of this invention. FIG. 6 illustrates a coated article including similar layers, except that in the FIG. 6 embodiment layers 11 and 13 are not present. In the FIG. 6 embodiment, silicon oxynitride inclusive layer 9b may be both a silicon-inclusive barrier layer and a lower contact layer, and make be made up of a combination of layers 9b and 11 from the FIG. 1 embodiment. In the FIG. 1 and FIG. 6 embodiments, the overcoat layer 7 may be of or include zirconium oxide, aluminum oxide, aluminum nitride, and/or aluminum oxynitride in example embodiments of this invention. The layers 9a, 9b and 11 of or including silicon nitride and/or silicon oxynitride may be doped with aluminum (e.g., from about 0.5 to 5% Al) in certain example embodiments, as is known in the art, so that the target can be conductive during sputtering of the layer.

Referring to FIGS. 1 and 6, the TCO 5 is protected from the environment by a layer or zirconium oxide 7. A silicon-inclusive barrier layer 11 may be provided between the TCO 5 and the substrate 1 also to help protect the TCO 5, e.g., from sodium migration. In the FIG. 1 example, the silicon-inclusive barrier layer 11 is silicon nitride, and the silicon nitride barrier layer 11 is provided adjacent to a layer of titanium oxide 13. The silicon nitride barrier layer 11 and the layer of titanium oxide 13 help with the optics of the overall article. It will be appreciated that a low/high/low layer stack system also may be used to improve the optics of the end product in certain example instances. In certain example embodiments, the silicon nitride barrier layer 11 may be oxided, e.g., so that it is a layer of silicon oxynitride. In other words, layer 11 may be of or include silicon oxynitride for example in certain example embodiments. In certain example embodiments, a barrier layer comprising silicon nitride (e.g., $Si_3N_4$ or other suitable stoichiometry) may replace the silicon-inclusive barrier layer 11 and the titanium oxide layer 13 in the FIG. 1 example.

Additional silicon-inclusive layers 9a and 9b may sandwich the TCO 5. As shown in the FIG. 1 example, the upper silicon-inclusive layer 9a is a layer of silicon nitride, whereas the lower silicon-inclusive layer 9b is a layer of silicon oxynitride. It will be appreciated that any suitable combination of silicon with oxygen and/or nitrogen may be used in different embodiments of this invention.

The following table provides example physical thicknesses and thickness ranges for the FIG. 1 example embodiment:

|          | Example Thickness Range (nm) | Example Thickness (nm) |
|----------|------------------------------|------------------------|
| ZrOx (7) | 2-15                         | 7                      |
| SiNx (9a)| 10-50                        | 30                     |
| ITO (5)  | 75-175                       | 130                    |
| SiOxNy (9b)| 10-50                      | 35                     |
| TiOx (13)| 2-10                         | 3.5                    |
| SiNx (11)| 10-20                        | 13                     |

The thicknesses for the layers 9b, 5, 9a and 7 for the FIG. 6 embodiment are similar and the above table is also applicable to those layers. However, in the FIG. 6 embodiment, silicon nitride and/or silicon oxynitride based layer 9b may be thicker, e.g., from about 10-200 nm thick, more preferably from about 10-100 nm thick. As indicated above, other TCOs may be used in place of, or in addition to, ITO. For instance, certain example embodiments may incorporate an ITO/Ag/ITO sandwich. Certain example embodiments, may incorporate zinc oxide, aluminum-doped zinc oxide (AZO), p-type aluminum oxide, doped or un-doped Ag, FTO, and/or the like. When Ag is incorporated into the layer stack system as a TCO, layers comprising Ni and/or Cr may be provided directly adjacent (contacting) the Ag. In certain example embodiments, each layer in the layer stack system may be sputter-deposited. In certain example embodiments, one or more layers may be deposited using a different technique. For instance, when FTO is incorporated as the TCO 5, it may be pyrolytically deposited (e.g., using combustion vapor deposition or CVD).

In certain example embodiments, layer of diamond-like carbon (DLC) may be provided directly over and contacting the zirconium oxide. This may help to create a more survivable, hydrophilic-like coating in certain example instances. Hydrophilic coatings generally involve a contact angle of less than or equal to 10 degrees. Sputter-deposited zirconium oxide tends to have a contact angle of less than about 20 degrees. However, forming DLC on top of the DLC on top of the zirconium oxide helps with its wettability and creates a harder layer. When tempered, for example, a zirconium oxide/DLC layer stack reaches a contact angle of less than or equal to about 15 degrees. Thus, a survivable, hydrophilic-like coating may be achieved. It is noted that this layer may be created by providing a layer of zirconium nitride followed by a layer of DLC which, upon tempering, will produce a layer of zirconium oxide followed by a layer of DLC. See, for example, applicant Ser. No. 12/320,664, which describes a heat treatable coated article including DLC and/or zirconium in its coating. The entire contents of this application are hereby incorporated herein by reference.

In addition or in the alternative, in certain example embodiments, a thin hydrophilic and/or photocatalytic coating may be provided over the zirconium oxide. Such a layer may comprise anatase $TiO_2$, BiO, BiZr, BiSn, SnO, and/or any other suitable material. Such a layer also may help with wettability and/or provide self-cleaning properties to the article.

In certain example embodiments, the zirconium oxide protective layer 7 may be replaced with aluminum oxide and/or aluminum oxynitride. Additionally, in certain example embodiments, the layer 7 may be initially deposited in multi-layer form so as to include a first layer of or including zirconium nitride directly on silicon nitride inclusive layer 9a, and a second layer of or including diamond-like carbon (DLC). Then, when heat treatment (e.g., thermal tempering including at a temperature(s) of at least about 580 degrees C.) is desired, the coated article is heat treated and the overlying DLC inclusive layer burns off during heat treatment and the zirconium nitride inclusive layer transforms into zirconium oxide thereby resulting in a heat treated coated article having a heat treated layer stack where the layer 7 is of or includes zirconium oxide (e.g., see FIGS. 1 and 6).

Although not shown in the FIG. 1 or FIG. 6 examples, a silver-based low-E coating may be provided on the glass substrate opposite the anticondensation coating 3. For example, the silver-based low-E coating may be any one of the low-E coatings described in U.S. Pat. Nos. 8,017,243; 7,858,191; or 7,964,284, or U.S. Publication Nos. 2009/0205956 or 2010/0075155, the entire contents of which are hereby incorporated herein by reference. Of course, other low-E coatings commercially available from the assignee of the instant invention and/or other low-E coatings also may be used in connection with different embodiments of this invention. For instance, other suitable low-E coatings are described in, for example, U.S. Pat. Nos. 7,455,910; 7,771,571; 7,166,359; 7,189,458; 7,198,851; 7,419,725; 7,521,096; and 7,648,769; as well as U.S. Publication Nos. 2007/0036986; 2007/0036990; 2007/0128451; 2009/0324967; 2010/0279144; 2010/0295330; 2011/0097590; 2011/0117371; 2011/0210656; 2011/0212311; and 2011/0262726; and U.S. application Ser. No. 13/064,066, filed on Mar. 3, 2011; Ser. No. 13/183,833, filed on Jul. 15, 2011; and Ser. No. 13/317,176, filed on Oct. 12, 2011. The entire contents of each of these patent documents is hereby incorporated herein by reference. It will be appreciated that silver-based and non-silver-based low-E coatings may be used in connection with certain example embodiments. It may sometimes be advantageous to use non-silver-based low-E coatings for durability purposes, and/or to provide heat treatable coatings. In some cases, it may be desirable to provide a coating with comparable sheet resistance and emissivity values to those provided above without including an Ag-based layer.

When the coated article is tempered, it may be run through a tempering furnace "face down." In other words, when the coated article is tempered, the anticondensation coating may face the rollers.

In certain example embodiments, the visible transmission may be high when an anticondensation coating is applied. For example, in certain example embodiments, the visible transmission preferably will be at least about 50%, more preferably at least about 60%, still more preferably at least about 65%. In certain example embodiments, the visible transmission may be 70%, 80%, or even higher.

Figure 2:
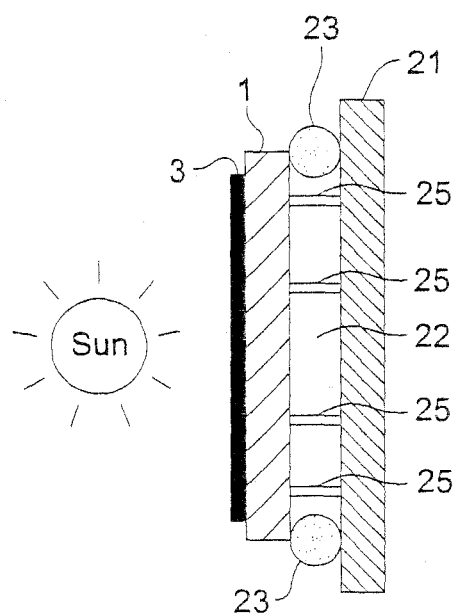
FIG. 2 is an insulating glass unit including an anticondensation coating (e.g., from any embodiment of this invention such as from the FIG. 1 and/or FIG. 6 embodiment) disposed on an outermost surface exposed to the exterior atmosphere in accordance with an example embodiment.

The coated article shown in FIG. 1 or FIG. 6 may be incorporated into a insulating glass (IG) unit. For example, FIG. 2 is an insulating glass unit including an anticondensation coating disposed on an outermost surface exposed to the exterior atmosphere in accordance with an example embodiment. The IG unit in the FIG. 2 example includes first and second substantially parallel spaced apart glass substrates 1 and 21. These substrates define a space or gap 22 therebetwen. The first and second substrates 1 and 21 are sealed using an edge seal 23, and a plurality of pillars 25 help maintain the distance between the first and second substrates 1 and 21. The first substrate 1 supports the anticondensation coating 3. As will be appreciated from the FIG. 2 example embodiment, the anticondensation coating 3 is exposed to the exterior environment. This is a departure from common practices, where low-E coatings generally are protected from the external environment. The FIG. 2 arrangement becomes possible because of the durability of the anticondensation coating 3.

Although not shown in FIG. 2, similar to as described above, a low-E coating (e.g., a silver-based low-E coating) may be provided on an interior surface of one of the first and second substrates 1 and 21. In other words, although not shown in FIG. 2, a low-E coating may be provided on surface 2 or surface 3 of the IG unit shown in FIG. 2.

When the FIG. 2 example embodiment is provided in connection with a skylight application, for example, the outer substrate 1 may be tempered and the inner substrate 21 may be laminated, e.g., for safety purposes. This may be true of other IG unit products, as well, depending on the desired application. In addition, it will be appreciated that the IG unit structure shown in the FIG. 2 example may be used in connection with generally vertical and generally horizontal applications. In other words, the IG unit structure shown in the FIG. 2 example may be used in refrigerator; freezer doors that are either generally upright or generally horizontal.

In certain example embodiments, the space or gap 22 between the first and second substrates 1 and 21 may be evacuated and/or filed with an inert gas (such as argon, for example), and the edge seal 23 may provide an hermetic seal, e.g., in forming a vacuum insulated glass (VIG) unit.

FIG. 2 shows an IG unit having two glass substrates. However, the example anticondensation coatings described herein may be used in connection with products that contain first, second, and third substantially parallel and spaced apart glass substrates (also sometimes referred to as "triple-glaze" products). The anticondensation coating may be disposed on surface 1 (the outermost surface exposed to the environment), and low-E coatings may be disposed on one or more interior surfaces (surfaces other than surface 1 and surface 6). For example, the anticondensation coating may be disposed on surface 1, and low-E coatings may be disposed on surfaces 2 and 5, 3 and 5, etc., in different embodiments of this invention. Such triple-glaze products may be IG units containing three lites or substrates, triple VIG units containing three lites or substrates, etc., in different embodiments of this invention. Triple glaze IG units are disclosed, for example, in U.S. application Ser. No. 13/324,267, filed on Dec. 13, 2011, the entire contents of which is incorporated herein by reference.

As indicated above, certain example embodiments may be used in connection with vehicle windshields, windows, mirrors, and/or the like. The hemispherical emissivity of the exterior glass surfaces of a vehicle typically is greater than about 0.84. However, by reducing the hemispherical emissivity to the above-identified (and/or other) ranges, the glass surface may retain more heat provided by the interior of the vehicle. This, in turn, may result in reduced or eliminated condensation buildup on the lite surface when a moving vehicle goes from colder to warmer climate (e.g., in hilly areas), reduced or eliminated condensation and/or frost buildup on the lite when parked and left over night, etc. The anticondensation coating in vehicle applications may be provided on the side of the glass that is exterior to the vehicle cabin.

The zirconium oxide topcoat is advantageous for vehicle window applications, as it has a comparatively low coefficient of friction. More particularly, this lower coefficient of friction facilitates the upward and downward movement of windows.

Certain example embodiments may be used in connection with any suitable vehicle including, for example, automobiles; trucks; trains; boats, ships and other vessels; airplanes; tractors and other work equipment; etc. In vehicle mirror applications, the optics of the coating may be tune such that a "double reflection" does not occur.

The inventors of the instant application have also realized that the anticondensation coating of certain example embodiments may be used to help meet the so-called "0.30/0.30 standard." Briefly, the 0.30/0.30 standard refers to a U-value of less than or equal to 0.30 and a solar heat gain coefficient (SHGC) of less than or equal to 0.30. Current legislation in the U.S. would give a tax credit for investing in windows, skylights, doors, etc., that meet these criteria.

Figure 3:
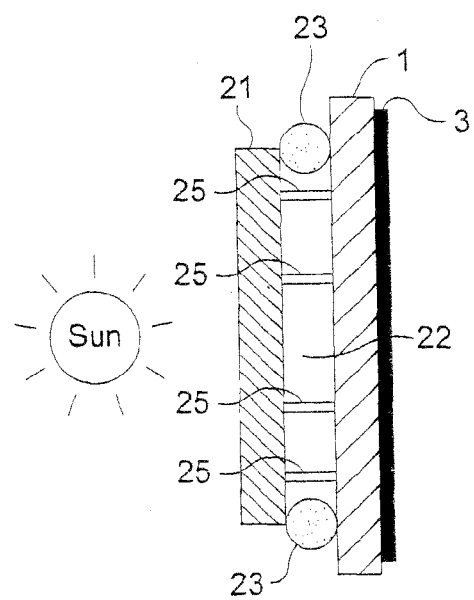
FIG. 3 is an insulating glass unit including an anticondensation coating (e.g., from any embodiment of this invention such as from the FIG. 1 and/or FIG. 6 embodiment) disposed on an innermost surface exposed to the interior environment in accordance with an example embodiment.

FIG. 3 is an insulating glass unit including an anticondensation coating (e.g., see the coating of FIG. 1 and/or FIG. 6) disposed on an innermost surface exposed to the interior environment in accordance with an example embodiment. The FIG. 3 example embodiment is similar to the FIG. 2 example embodiment, except that the FIG. 3 example embodiment has the anticondensation coating 3 located on surface 4, which is the exterior surface of the inner glass substrate 1 that is exposed to the building interior rather than the outside environment.

In certain example embodiments, the inner substrate 1 may be annealed (rather than tempered). The anticondensation coating may remain the same or substantially the same as between the FIG. 2 and FIG. 3 example embodiments, although the modifications described above in connection with FIGS. 1, 2 and/or 6 also may be made in connection with an embodiment like FIG. 3. One change that might be made is increasing the thickness of the ITO to achieve the desired U-value performance. In such cases where the ITO is thickened, the thicknesses of the other layers may also be adjusted so that the desired optical properties are achieved. Additional layers also may be added to achieve the desired optical properties. The other structural elements remain the same as between FIGS. 2 and 3, and similar modifications may be made thereto.

When the anticondensation coating 3 is disposed on surface 4 as shown in FIG. 3, the U-value has been determined to be 0.29. When an additional low-E coating is provided on surface 2 of the IG unit, the U-value has been found to drop to 0.23. Certain example embodiments also may provide a SHGC less than or equal to 0.30, thereby helping meet the 0.30/.30 standard.

Figure 4:
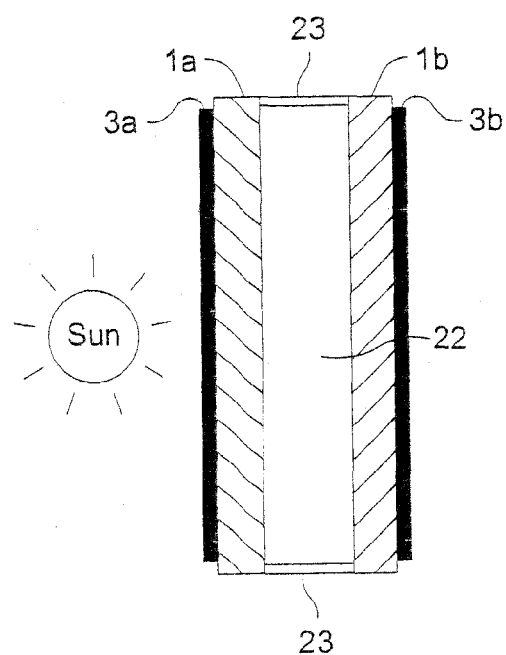
FIG. 4 is an insulating glass unit including anticondensation coatings (e.g., from any embodiment of this invention such as from the FIG. 1 and/or FIG. 6 embodiment) disposed on outermost and innermost surfaces of the insulating glass unit in accordance with an example embodiment.

In products with low U-values (e.g., IG or VIG units with the anticondensation coating on surface 4, two- and three-lite VIG units, etc.), condensation can become a problem, e.g., as the glass is not heated because of the low-emissivity coatings. One solution to this challenge is presented in FIG. 4, which is an insulating glass unit including anticondensation coatings disposed on outermost and innermost surfaces of the insulating glass unit in accordance with an example embodiment. In the FIG. 4 example, first and second substrates 1*a* and 1*b* are provided. First and second anticondensation coatings 3*a* and 3*b* are provided on surfaces 1 and 4, respectively. In certain example embodiments, additional low-E coatings also may be provided on one or both of the inner surfaces (surfaces 2 and/or 3). In this way, it is possible to provide a product that exhibits U-value reduction and anticondensation behaviors.

Figure 5:
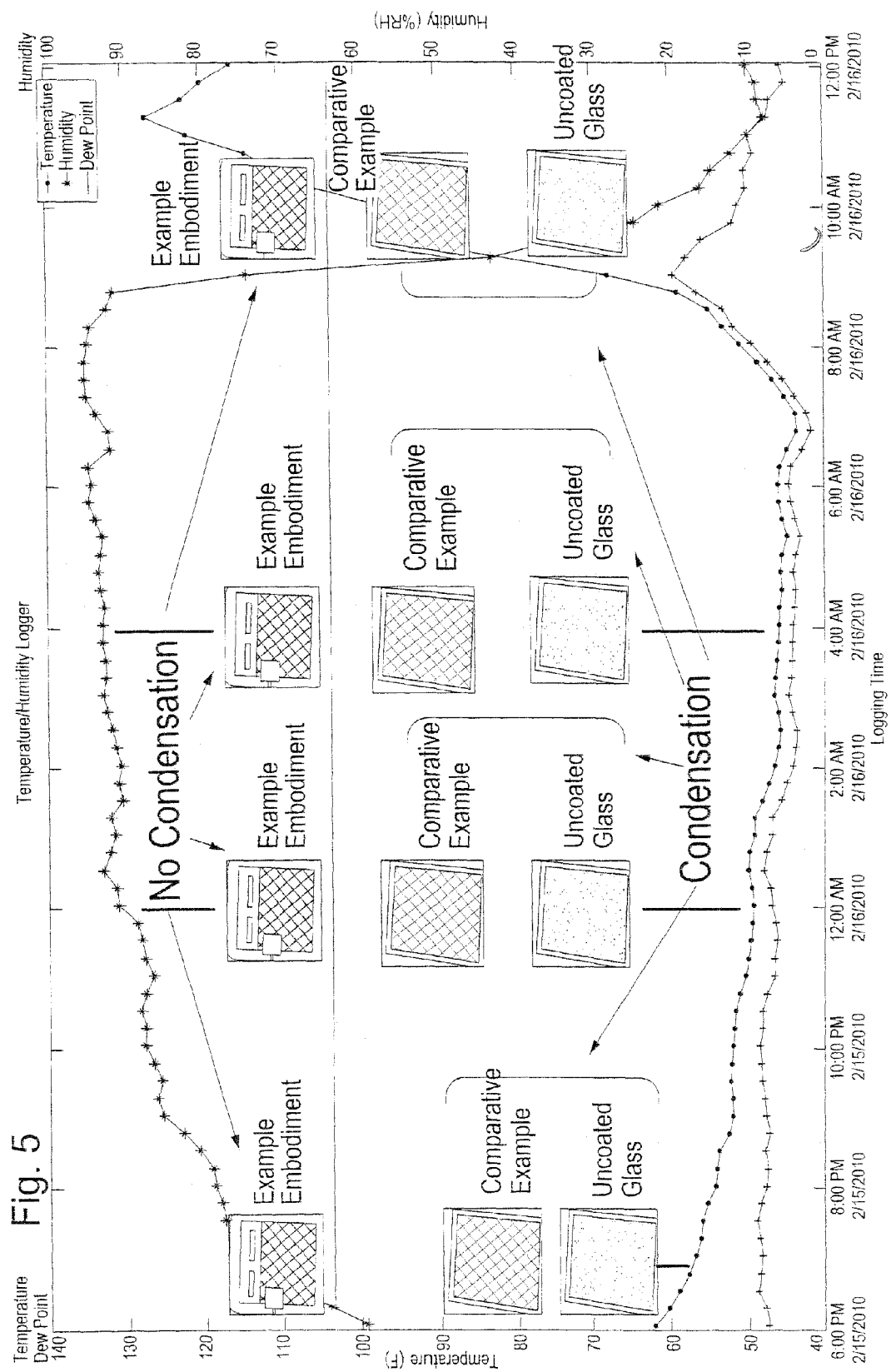
FIG. 5 is a graph illustrating the performance of an example embodiment, a current anticondensation product, and a bare glass substrate as the temperature, humidity, and dew point change over an 18 hour time period.

FIG. 5 is a graph illustrating the performance of an example embodiment, a current anticondensation product, and a bare glass substrate as the temperature, humidity, and dew point change over an 18 hour time period. The images in FIG. 5 each have a "crisscross" pattern printed thereon to help demonstrate the presence or absence of condensation. As can be seen from FIG. 5, there is virtually no condensation formed on those samples that were produced in accordance with an example embodiment. By contrast, the comparative example, which includes pyrolytically deposited FTO, shows some condensation being formed in the first observed period, with the level of condensation greatly increasing through the second and third observed periods, and abating slightly by the fourth observed period. Indeed, the "crisscross" pattern is significantly blurry at the second observed period and barely visible during the third. The uncoated glass sample shows significant condensation during all observed periods. The "crisscross" pattern in the second and third observed periods cannot be seen. The FIG. 5 example thus demonstrates that the example embodiments described herein provide superior performance when compared to the current comparative example and uncoated glass.

Figure 7:
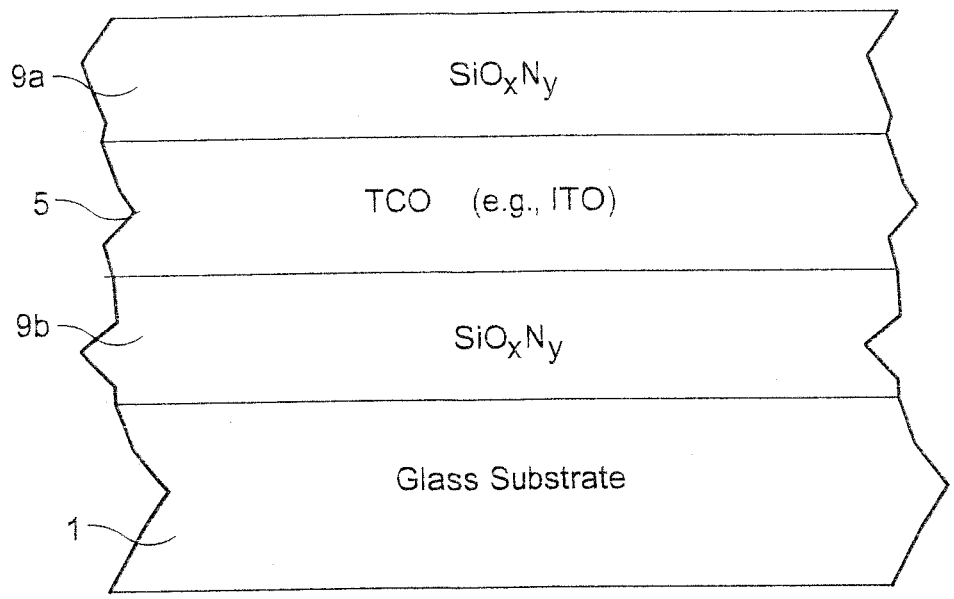
FIG. 7 is a coated article including an anticondensation coating in accordance with an example embodiment.

FIG. 7 is a coated article including an anticondensation coating in accordance with an example embodiment. The FIG. 7 example layer stack is similar to the previously described example layer stacks in that it includes a TCO layer 5 sandwiched by first and second silicon-inclusive layers 9a and 9b. In the FIG. 7 example embodiment, the first and second silicon-inclusive layers 9a and 9b comprises silicon oxynitride. The first and second layers comprising silicon oxynitride 9a and 9b sandwich a TCO layer 5 comprising ITO. Example thicknesses and indices of refraction for each of the layers is provided in the table that follows:

| | Example Thickness Range (nm) | First Example Thickness (nm) | Second Example Thickness (nm) | Example Index of Refraction Range | Preferred Index of Refraction Range | First Example Index of Refraction | Second Example Index of Refraction |
|---|---|---|---|---|---|---|---|
| SiO$_x$N$_y$ | 30-100 | 60 | 70 | 1.5-2.1 | 1.7-1.8 | 1.75 | 1.7 |
| ITO | 95-160 | 105 | 105 | 1.7-2.1 | 1.8-1.93 | 1.88 | 1.9 |
| SiO$_x$N$_y$ | 30-100 | 65 | 70 | 1.5-2.1 | 1.7-1.8 | 1.75 | 1.7 |
| Glass | N/A | N/A | N/A | N/A | N/A | N/A | N/A |

Other variants of this layer stack are possible in different embodiments of this invention. Such variants may include, for example, using partially or fully oxided and/or nitrided layers for the first and/or second silicon-inclusive layers, adding a protective overcoat comprising ZrOx, adding one or more index matching layers (e.g., comprising TiOx) between the glass substrate and the second silicon-inclusive layer, etc. For instance, certain example embodiments may involve modifying to FIG. 7 example layer stack so as to replace the top layer comprising SiOxNy with SiN, add a layer comprising ZrOx (e.g., to potentially increase durability), both replace the top layer comprising SiOxNy with SiN and add a layer comprising ZrOx, etc. Thus, it will be appreciated that the possible modifications listed herein may be used in any combination or sub-combination.

Modifications also may be made to meet the so-called "R5 window" rating (whole window U-value<0.225) with a low emissivity (e.g., <0.20). To meet such standards, the thickness of the TCO layer may be increased. Projected ITO thickness increases and performance metrics are provided in the table below. It will be appreciated that the silicon-inclusive layers may also be adjusted to maintain acceptable optics, and/or that dielectric layers such as layers comprising titanium oxide may be added. It is noted that the glass substrates are assumed to be 3 mm clear glass substrates, that a low-E coating is provided on surface 2, and that a ½" gap filled with approximately 90% Ar and 10% air is provided in the IGU embodiments.

| #4 Emissivity | Monolithic | | IGU | | U-value COG | ITO Thickness | % U-value Improvement |
|---|---|---|---|---|---|---|---|
| | Tvis | Rvis | Tvis | Rvis, in | | | |
| 0.84 (no coating) | n/a | n/a | 69.3 | 12.6 | 0.247 | 0 | n/a |
| 0.20 | 87.5 | 8.5 | 67.4 | 12.4 | 0.205 | 130 | 17.0% |
| 0.15 | 86.2 | 8.5 | 66.4 | 12.4 | 0.200 | 195 | 19.0% |
| 0.10 | 85.0 | 8.5 | 65.5 | 12.4 | 0.194 | 260 | 21.5% |
| 0.05 | 80.0 | 8.5 | 61.6 | 12.0 | 0.188 | 520 | 23.9% |

The FIG. 7 example embodiment advantageously is very durable, e.g., after heat treatment, even though it does not include an overcoat layer comprising ZrOx or the like. It therefore has been found to be suitable for use as a so-called Surface 4 coating. As is known, the fourth surface of an IGU, for example, is the surface farthest from the sun (and thus typically facing a building interior). Thus, the FIG. 7 example layer stack is particularly well-suited for use in an assembly similar to that shown in FIG. 3. It also will be appreciated that the FIG. 7 example embodiment is suitable for use in connection with other glazings where it is the provided on an innermost surface facing the interior of the building (e.g., on surface 6 of a triple-IGU, etc.).

As alluded to above, the FIG. 7 example layer stack is heat treatable in certain example embodiments. Such heat treatment may be accomplished using an infrared (IR) heater, a box or other furnace, a laser annealing process, etc. Further example details of heat treatment are provided below. The two tables that follow include performance data for the monolithic FIG. 7 layer stack post-IR heat treatment and post-belt furnace heat treatment (e.g., at 650 degrees C.), respectively.

Monolithic Annealed (Post IR Treatment) Performance Data

| Glass Thickness (mm) | 2.8 mm |
|---|---|
| T | 88.49 |
| a*, Transmission | −0.56 |
| b*, Transmission | 0.22 |
| L*, Transmission | 95.36 |
| Rg | 9.11 |
| a*, Glass Side | −0.4 |
| b*, Glass Side | −1.13 |
| L*, Glass Side | 36.20 |
| Rf | 9.10 |
| a*, Film Side | −0.72 |
| b*, Film Side | −1.13 |
| L*, Film Side | 36.17 |
| Transmitted Color Rendering Index (CRI) | 97.91 |
| T-Haze | 0.12 |
| Surface Roughness | 1.8 |
| Sheet Resistance | 17-19 |
| Hemispherical Emittance | 0.20 or 0.21 |

Monolithic Tempered (belt furnace 650) Performance Data

| | |
|---|---|
| T | 88.10 |
| ΔE (Annealed to Tempered) | 0.37 |
| a*, Transmission | −0.60 |
| b*, Transmission | 0.54 |
| L*, Transmission | 95.20 |
| Rg | 9.08 |
| ΔE (Annealed to Tempered) | 1.04 |
| a*, Glass Side | −0.26 |
| b*, Glass Side | −2.16 |
| L*, Glass Side | 36.14 |
| Rf | 9.06 |
| ΔE (Annealed to Tempered) | 1.16 |
| a*, Film Side | −0.69 |
| b*, Film Side | −2.28 |
| L*, Film Side | 36.10 |
| Transmitted Color Rendering Index (CRI) | 97.91 |
| T-Haze | 0.12 |
| Surface Roughness | 1.8 |
| Sheet Resistance (NAGY) | 17-19 |
| Hemispherical Emittance | 0.19 or 0.20 |

As indicated above, the FIG. 7 example embodiment may be heat treated using, for example, an infrared (IR) heater, a box or other furnace, a laser annealing process, etc. A post deposition heat treatment step may be advantageous in helping to re-crystallize the ITO layer and in helping to achieve the desired emissivity and optics (e.g., including those described above). In an example process, the glass may be heated to a temperature of approximately 400 degrees C. to help meet these aims. In certain example embodiments, the glass temperature will not exceed 470 degrees C., so as to help reduce the likelihood of permanent (or at least non-temporary) stress changes being introduced in the glass.

Certain example embodiments may use a laser diode array in connection with a laser annealing process. It has been found that a laser diode array with the following parameters advantageously helps reduce the sheet resistance to about 20 ohms/square (from, for example, about 65 ohms/square in the as-deposited state), helps achieve a substantially uniform coating appearance, and helps meet the above-listed performance metrics:

Laser power—1 kW
Emission wavelength—975 nm
Scan rate—75 mm/sec.
Spot size—nominally 12.5 mm×2 mm A furnace having multiple zones also may be used for heat treating certain example embodiments. Zone temperature, line speed, temperature bias (e.g., top/bottom), aspiration, element trimming (e.g., across the furnace), cooling air settings (e.g., pressure and flow bias), and/or other factors may be tuned to help achieve the desired performance characteristics. In certain example embodiments, a ten-zone furnace may be used to accomplish the heat treating. A partial subset of the zones may help with the ITO re-crystallization process, whereas other zones may help to slowly cool the substrate prior to its exit from the furnace. In one example where a ten-zone furnace was used, zones 1-3 were found to be active in the ITO re-crystallization process, heating the coating to a temperature near 400 degrees C., whereas the remainder of the furnace helped slowly cool the glass prior to exit into the cooling air sections. It will be appreciated that it would be desirable in certain example instances to maintain a low exit temperature in order to help reduce the likelihood of breakage. Indeed, glass is very sensitive to thermal breakage over the temperature range involved in the re-annealing process, particularly at temperatures over 200 degrees C.

Further parameters influencing thermal breakage include the temperature differential through the glass thickness, as well as the differential across its surface. The former was found to have a large impact on thermal breakage with respect to the coated substrates. The top and bottom surface temperatures of uncoated glass exiting the furnace were nearly identical, and the vast majority of clear glass survived the annealing process after the initial profile was established (line speed, zone temp., cooling air, no bias). However, the top surface of the coated product was measured to be as much as 250 degrees F. higher at the furnace exit. This is because heat is lost faster through conductive transfer to the rolls than radiant transfer from the coated top surface.

However, by identifying and understanding this differential and biasing heating and cooling, it is possible to reduce this difference and, in turn, to help reduce the likelihood of breakage. Example furnace profiles for 3.2 mm and 2.3 mm glass are provided in the tables below, respectively.

3.2 mm Furnace Profile

| | | Zone | | | | | | | | | |
|---|---|---|---|---|---|---|---|---|---|---|---|
| Furnace | Temp. (F.) | 1 | 2 | 3 | 4 | 5 | 6 | 7 | 8 | 9 | 10 |
| Top | Setpoint | 1420 | 1420 | 1420 | 0 | 0 | 0 | 0 | 0 | 0 | 0 |
| | Actual | 1422 | 1442 | 1423 | 937 | 745 | 693 | 565 | 551 | 585 | 581 |
| Bottom | Setpoint | 1420 | 1420 | 1420 | 0 | 700 | 700 | 700 | 700 | 700 | 700 |
| | Actual | 1440 | 1438 | 1431 | 825 | 780 | 743 | 730 | 453 | 690 | 705 |

The following parameters were used in connection with this example heating profile:
Line Speed: 60 ft/min
Aspiration: 0
Trim (Zones 1-3): 5-10 (50%)—center, all others 100%
Primary Quench: Set point=0 and damper closed
Mid-Range Cooling: 1" H2O, set point=0 and damper open
After Cooler: 1" H2O, set point=0 and damper open 2.3 mm Furnace Profile

| | | Zone | | | | | | | | | |
|---|---|---|---|---|---|---|---|---|---|---|---|
| Furnace | Temp. (F.) | 1 | 2 | 3 | 4 | 5 | 6 | 7 | 8 | 9 | 10 |
| Top | Setpoint | 1420 | 1420 | 1420 | 0 | 0 | 0 | 0 | 0 | 0 | 0 |
| | Actual | 1422 | 1442 | 1423 | 937 | 712 | 643 | 544 | 525 | 542 | 570 |

-continued

| Furnace | Temp. (F.) | Zone | | | | | | | | | |
|---|---|---|---|---|---|---|---|---|---|---|---|
| | | 1 | 2 | 3 | 4 | 5 | 6 | 7 | 8 | 9 | 10 |
| Bottom | Setpoint | 1420 | 1420 | 1420 | 0 | 600 | 600 | 600 | 600 | 600 | 600 |
| | Actual | 1440 | 1438 | 1431 | 825 | 644 | 609 | 612 | 386 | 602 | 601 |

The following parameters were used in connection with this example heating profile:
Line Speed: 70 ft/min
Aspiration: 0
Trim (Zones 1-3): 5-10 (50%)—center, all others 100%
Primary Quench: 1" H2O, top only, set point=0 and damper open
Mid-Range Cooling: Set point=0 and damper closed
After Cooler: 1" H2O, set point=0 and damper open As still another option, wavelength-tuned IR radiation may be used for heat-treating in certain example embodiments. Example techniques are set forth in U.S. patent application Ser. No. 12/923,082, filed Aug. 31, 2010, the entire contents of which are hereby incorporated herein by reference. The TCO layer may be preferentially and selectively heat treated using specifically tuned near infrared-short wave infrared (NIR-SWIR) radiation, for example. Selective heating of the coating may in certain example embodiments be obtained by using IR emitters with peak outputs over spectral wavelengths where ITO is significantly absorbing but where the substrate (e.g., glass) has reduced or minimal absorption. In certain example embodiments, the coating will be preferentially heated thereby improving its properties while at the same time keeping the underlying substrate temperatures low.

By preferentially heating the coating using the high-intensity, wavelength-tuned IR radiation techniques described herein, heat treatment of the ITO layer is possible at lower substrate temperatures and/or shorter heating times than would be required by conventional means. Preferential heating is achieved by using IR wavelengths that are absorbed much more strongly by the coating than the substrate. High intensity IR radiation may be supplied, for example, by quartz lamps or laser emitters.

In the case of laser emitters, laser diode arrays may be advantageous, e.g., given their lower cost of ownership compared to other common laser types (and the availability of about 800-1050 nm (for example, 940 nm) wavelength output matches well with the spectral characteristics of the coating). However, excimer, $CO_2$, YAG, quartz, and/or other types of lasers and/or lamps also may be used in different embodiments. For example, it is noted that an 810 nm wavelength is common for some diode lasers (and in general may be used in connection with low-E type coatings, for instance), and that a 1032 nm wavelength is common for some YAG lasers. Still further, certain example embodiments may use other lasers (e.g., $CO_2$ or other lasers) to very rapidly heat the glass and thereby indirectly heat the coating. In certain example embodiments, electromagnetic radiation may be focused into a very high aspect ratio rectangular beam spanning the width of the glass. The glass may be traveling on a conveyor in a direction perpendicular to the long axis of the rectangle. In certain example embodiments, a "step and repeat" process may be employed, e.g., so as to irradiate smaller sections in a controlled manner such that the entire substrate ultimately is irradiated. In addition, other sizes and/or shapes may be used including, for example, substantially square shapes, circular shapes, etc.

In general, higher power densities have been found to be preferable because they permit shorter heating times and higher temperature gradients from the coating through the bulk substrate. With shorter heating times, less heat is transferred from the coating through the glass via conduction and a lower temperature may be maintained.

Figure 8:
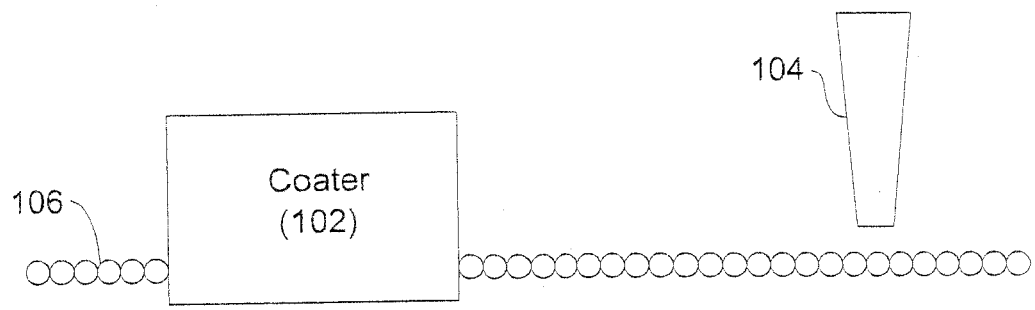
FIG. 8 is a schematic view of a system incorporating an IR heater in accordance with certain example embodiments.

FIG. 8 is a schematic view of a system incorporating an IR heater in accordance with certain example embodiments. The FIG. 8 example system includes a coater 102 for physical vapor depositing one or more thin film layers on a substrate, e.g., via sputtering. Downstream of the coater 102 is an IR heater 104. In certain example embodiments, a room temperature sputtering apparatus may be used to deposit ITO on a glass substrate. A conveyor system 106 conveys a substrate through the coater 102, where the layer or layer stack is deposited, and to the IR heater 104. The IR heater 104, in turn, is tuned to focus NIR-SWIR radiation at the substrate with the coating thereon. The wavelength of the IR radiation is selected to as to preferentially heat the coating or a particular layer in the coating, e.g., as compared to the substrate and/or any other layers in a multilayer coating.

Although certain example embodiments have been described as including an IR heater downstream of the coater, it will be appreciated that different example embodiments may locate a coater within a vacuum chamber of the coater. In addition, in certain example embodiments, the IR heat treatment may be performed at any time once the layer to be heat treated or activated has been deposited. For instance, certain example embodiments may perform an IR heat treatment just after ITO layer deposition, whereas certain example embodiments may perform an IR heat treatment once all layers in a layer stack have been deposited. In certain example embodiments, multiple IR heat treatments may be performed at different times during the deposition process.

A short-wave infrared (SWIR) furnace incorporating quartz lamps may be used in certain example embodiments. A peak IR emission wavelength of 1.15 µm may be used to heat the coating. This wavelength was determined by analyzing the spectral characteristics of the coating and the glass substrate, although other wavelengths of course are possible. Indeed, an example wavelength range for heating of 0.8-2.5 µm has been determined. More preferably, the IR emission range is 1-2 µm. The techniques described in U.S. patent application Ser. No. 12/923,082, for example, may be used to establish optimum or preferred IR emission ranges for heat treating other coatings (e.g., other TCO, metallic, etc., coatings) on glass, as well.

The power density of the SWIR furnace is 10.56 kW/ft² (bulb output is 80 W/in, with mounting on 1" centers). Heating times may range from 12-130 sec with 12 sec intervals, for example. Heating elements may be about 4" from the glass surface, although the heating elements may be raised or lowered in different example embodiments of this invention.

By targeting IR wavelengths absorbed by the coating, it is possible to generate a large thermal gradient between the coating and bulk substrate. Because the thermal mass of the coating is very small compared to the glass, the glass essentially acts as a quench mechanism. The rise in bulk glass temperature is mainly attributed to direct heat transfer by IR absorption, rather than by conduction from the coating.

It has been found that the final crystallinity of the film is obtained after only 48-60 sec of heating, although short or longer times are of course possible.

The initial oxidation level of the ITO on the samples used herein has been optimized for low sheet resistance following tempering (which results in additional oxidation of the ITO). It is likely that a different optimum exists for heat treating ITO using NIR radiation. When the initial oxidation level of the ITO is optimized for NIR heating, it should be possible to significantly reduce the amount of heating required. Theoretically, this time should be reduced to the 48-60 sec required for re-crystallization using the same heating process. Further decreases is heating time may be achieved by optimizing the power density vs. heating time requirements.

The IR heating techniques described herein preferably preferentially heat the ITO in the coating such that the glass substrate remains below its transition temperature, which is about 480 degrees C. for float glass. Preferably, the glass substrate remains below 450 degrees C., and more preferably below 425 degrees C. In certain example embodiments, where a peak emission of 1.15 μm is applied for 108 sec, the sheet resistance of the example coating is about one-third of its as-deposited equivalent, and the emissivity and absorption correspondingly drop to about one-half of their as-deposited counterpart values. In the meantime, the substrate temperature reaches a maximum of only about 400 degrees C., which is well below its transition temperature.

NIR generally includes IR having a wavelength of 0.75-1.4 μm, and SWIR generally includes IR having a wavelength of 1.4-3 μm. Certain example embodiments may generally operate within these wavelengths. The substrate temperature preferably does not exceed 480 degrees C., more preferably 450 degrees C., still more preferably 425 degrees C., and sometimes 400 degrees C., as a result of such NIR-SWIR heating.

Although certain example embodiments have been described herein as relating to anticondensation coatings, the coatings described herein may be used in connection with other applications. For instance, the example coatings described herein may be used in connection with refrigerator/freezer and/or other merchandizer applications, skylights, etc.

In certain example embodiments, following heat treatment or activation via the techniques described herein, a coated article may be forwarded to a fabricator or other location, e.g., for further processing such as, for example, cutting, sizing, incorporation into a further article (e.g., a insulating glass unit, skylight, vehicle, glazing, etc.). Preferably, breaking or catastrophic failures of the heat treated coated article will not result as a result of changes to the glass caused by the heat treatment process.

"Peripheral" and "edge" seals herein do not mean that the seals are located at the absolute periphery or edge of the unit, but instead mean that the seal is at least partially located at or near (e.g., within about two inches) an edge of at least one substrate of the unit. Likewise, "edge" as used herein is not limited to the absolute edge of a glass substrate but also may include an area at or near (e.g., within about two inches) of an absolute edge of the substrate(s).

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

It will be appreciated that certain example embodiments may incorporate one or more additional low-E coatings on a surface of one or more glass substrates facing the air gap therebetween (e.g., surfaces 2 and/or 3 in an IGU; surfaces 2, 3, 4, and/or 5 in a triple-IGU, etc.). A surface 4 low-E coating disposed on clear glass, for example, may help improve the overall window u-value, e.g., by reflecting infrared heat back inside the building. The glass in certain example embodiments may be 2.3 mm to 6 mm clear float glass in certain example embodiments. In such embodiments, the hemispherical emissivity may be reduced to 0.3 and sheet resistance to 30 ohms/square. Preferably, emissivity may be reduced to 0.23-0.30 and sheet resistance to 30 ohms/square, and sometimes emissivity may be reduced to less than or equal to about 0.2 and sheet resistance to less than or equal to about 20 ohms/square.

For instance, as alluded to above, it may be desirable in certain example scenarios to provide a more durable low-E coating on an outer surface of an IG unit and a potentially less durable low-E coating on an inner surface of the IG unit where it can be protected. One example configuration, then, would involve a low-E coating being provided to both sides of a single substrate, e.g., surfaces 1 and 2, or surfaces 3 and 4. Of course, other arrangements also are contemplated (e.g., where surfaces 1 and 3, or surfaces 2 and 4 are provided with low-E coatings). The low-E coating provided on surface 4 may be a more durable coating than the low-E coating provided to surface 3, which is naturally protected from the outside environment by virtue of its location within the cavity of the IG unit. The low-E coating provided on surface 4 may be any of the coatings described above, e.g., in connection with FIGS. 1, 6, and 7. The low-E coating provided on surface 3 may have a SHGC sufficient to reduce overall the U-value of the IG unit to a desired level (e.g., that complies with the 0.30/.30 standard noted above). In certain example embodiments, the interior facing low-E coating may be a silver-based low-E coating, whereas the low-E coating exposed to the exterior surface may be an ITO-based coating.

The above-listed silver-based low-E coatings may be used on FIG. 3 for this purpose. Other suitable low-E coatings that may be used on the interior surface include the example coatings set forth below.

FIRST EXAMPLE

Ag-Based Low-E Coating

| Material Glass | Preferred Thickness (Å) | More Preferred Thickness (Å) | Example Thickness 1 (Å) | Example Thickness 2 (Å) |
|---|---|---|---|---|
| $Si_xN_y$ | 1-500 | 100-300 | 160 | 160 |
| $TiO_x$ | 75-125 | 85-115 | 100 | 100 |
| ZnO | 35-75 | 40-70 | 60 | 50 |
| SnO | 35-200 | 50-135 | 100 | 70 |
| ZnO | 30-200 | 40-130 | 60 | 100 |
| Ag | 60-110 | 70-100 | 85 | 85 |
| NiCrOx | 20-40 | 23-37 | 30 | 30 |
| SnO | 150-275 | 170-255 | 220 | 200 |
| $Si_xN_y$ | 1-1000 | 100-500 | 220 | 250 |

SECOND EXAMPLE

Ag-Based Low-E Coating

| Material Glass | Preferred Thickness (Å) | More Preferred Thickness (Å) | Example Thickness 1 (Å) | Example Thickness 2 (Å) |
|---|---|---|---|---|
| $Si_xN_y$ | 1-500 | 10-300 | 156 | 156 |
| $TiO_x$ | 15-50 | 30-40 | 33 | 35 |
| ZnO | 70-200 | 95-125 | 114 | 110 |
| $TiO_x$ | 15-50 | 30-40 | 33 | 35 |
| ZnO | 70-200 | 95-125 | 114 | 110 |
| Ag | 70-120 | 80-100 | 90 | 90 |
| NiCrOx | 1-100 | 10-50 | 30 | 30 |
| SnO | 110-150 | 115-145 | 130 | 130 |
| ZnO | 70-200 | 95-125 | 109 | 109 |
| $Si_xN_y$ | 115-185 | 125-155 | 140 | 140 |
| $ZrO_x$ | 1-200 | 10-80 | 40 | 40 |

Further details regarding the first and second example Ag-based low-E coatings discussed above are set forth in detail in U.S. application Ser. No. 13/333,069, filed on Dec. 21, 2011, and which is hereby incorporated herein by reference in its entirety.

THIRD EXAMPLE

Ag-Based Low-E Coating

| Material Glass | Preferred Thickness (Å) | More Preferred Thickness (Å) | Example Thickness 1 (Å) | Example Thickness 2 (Å) |
|---|---|---|---|---|
| $Si_xN_y$ | 1-500 | 10-300 | 135 | 140 |
| $TiO_x$ | 60-110 | 65-100 | 80 | 85 |
| $Si_xN_y$ | 50-90 | 55-80 | 65 | 70 |
| $ZnO_x$ or $ZnAlO_x$ | 60-110 | 70-100 | 85 | 85 |
| Ag | 60-110 | 65-100 | 80 | 85 |
| $NiCrO_x$ | 22-42 | 25-38 | 30 | 33 |
| $SnO_x$ | 125-215 | 145-195 | 170 | 170 |
| $Si_xN_y$ | 1-500 | 10-300 | 170 | 170 |

FOURTH EXAMPLE

Ag-Based Low-E Coating

| Material Glass | Preferred Thickness (Å) | More Preferred Thickness (Å) | Example Thickness 1 (Å) | Example Thickness 2 (Å) |
|---|---|---|---|---|
| $TiO_x$ | 135-250 | 150-230 | 200 | 180 |
| $SnO_x$ (optional) | 0-40 | 1-30 | — | 20 |
| $ZnO_x$ or $ZnAlO_x$ | 30-63 | 33-60 | 40 | 50 |
| Ag | 100-170 | 115-155 | 135 | 135 |
| $NiCrO_x$ | 1-100 | 10-50 | 30 | 30 |
| $TiO_x$ | 30-50 | 35-45 | 40 | 40 |
| $ZnO_x$ | 120-200 | 135-185 | 160 | 160 |
| $Si_xN_y$ | 1-500 | 100-300 | 210 | 210 |

FIFTH EXAMPLE

Ag-Based Low-E Coating

| Material Glass | Preferred Thickness (Å) | More Preferred Thickness (Å) | Example Thickness 1 (Å) | Example Thickness 2 (Å) |
|---|---|---|---|---|
| $TiO_x$ | 120-210 | 140-190 | 165 | 165 |
| $ZnO_x$ or $ZnAlO_x$ | 60-100 | 65-95 | 80 | 80 |
| Ag | 155-260 | 175-240 | 208 | 208 |
| $NiCrO_x$ | 1-100 | 10-50 | 30 | 30 |
| $TiO_x$ | 30-50 | 35-45 | 40 | 40 |
| $SnO_x$ |  |  | 220 | 149 |
| $Si_xN_y$ | 1-500 | 100-400 | 250 | 322 |

SIXTH EXAMPLE

Ag-Based Low-E Coating

| Material Glass | Preferred Thickness (Å) | More Preferred Thickness (Å) | Example Thickness (Å) |
|---|---|---|---|
| $TiO_x$ | 120-210 | 140-190 | 165 |
| $Si_xN_y$ | 1-500 | 30-300 | 100 |
| $ZnO_x$ or $ZnAlO_x$ | 60-100 | 65-95 | 80 |
| Ag | 75-125 | 85-115 | 100 |
| $NiCrO_x$ | 1-100 | 10-50 | 35 |
| $TiO_x$ | 33-60 | 38-52 | 45 |
| $SnO_x$ | 120-200 | 135-185 | 160 |
| $Si_xN_y$ | 1-500 | 50-350 | 180 |
| $ZrO_x$ | 1-100 | 5-50 | 20 |

In certain example embodiments, an insulating glass (IG) unit is provided. First and second substantially parallel spaced apart glass substrates are provided, with the first and second substrates providing, in order, first through fourth substantially parallel major surfaces of the IG unit. A gap is defined between the first and second substrates. A fourth surface of the IG unit supports a first low-E coating comprising a plurality of thin film layers including, in order moving away from the second substrate: a first layer comprising silicon oxynitride having an index of refraction of 1.5-2.1 and being 50-90 nm thick, a layer comprising ITO having an index of refraction of 1.7-2.1 and being 85-125 nm thick, and a second layer comprising silicon oxynitride having an index of refraction of 1.5-2.1 and being 50-90 nm thick.

In addition to the features of the previous paragraph, in certain example embodiments, the first and second layer comprising silicon oxynitride may have indices of refraction of 1.7-1.8.

In addition to the features of either of the two prior paragraphs, in certain example embodiments, the layer comprising ITO may have an index of refraction of 1.8-1.93.

In addition to the features of any of the previous three paragraphs, in certain example embodiments, the first and second layers comprising silicon oxynitride may have indices of refraction and thicknesses that vary from one another by no more than 0.1 and 10 nm, respectively.

In addition to the features of any of the previous four paragraphs, in certain example embodiments, the third surface of the IG unit may support a second low-E coating comprising a plurality of thin film layers including, in order moving away from the second substrate: a first silicon-based layer; a first dielectric layer; a second dielectric layer split by a third dielectric layer so as to form first and second portions of the second dielectric layer; a metallic or substantially metallic infrared (IR) reflecting layer over and directly contacting the second portion of the second dielectric layer; an upper contact layer comprising an oxide of Ni and/or Cr directly over and contacting the IR reflecting layer; a fourth dielectric layer; and a second silicon-based layer. The third dielectric layer may comprise either titanium oxide or tin oxide.

In addition to the features of the previous paragraph, in certain example embodiments, the first dielectric layer may be a high refractive index layer comprising an oxide or suboxide of titanium.

In addition to the features of either of the two prior paragraphs, in certain example embodiments, the third and fourth dielectric layers may comprise tin oxide.

In addition to the features of the previous paragraph, in certain example embodiments, the second dielectric layer may comprise zinc oxide.

In addition to the features of the previous paragraph, in certain example embodiments, the second layer may be split such that the parts thereof have thicknesses that vary by no more than 5% of one another.

In addition to the features of any of the previous five paragraphs, in certain example embodiments, the first and second silicon-based layers may each comprise silicon nitride, the first dielectric layer may comprise titanium oxide, the second dielectric layer may comprise zinc oxide, the third and fourth dielectric layers may each comprise tin oxide, and the IR reflecting layer may comprise Ag.

In addition to the features of any of the previous six paragraphs, in certain example embodiments, the second substrate may be heat treated with the first and/or second low-E coatings disposed thereon.

In addition to the features of any of the previous seven paragraphs, in certain example embodiments, the second low-E coating may have a SHGC sufficient to bring the U-value of the IG unit to less than or equal to 0.30.

In certain example embodiments, there is provided a coated article comprising a substrate supporting first and second low-E coatings on opposing major surfaces thereof, respectively. The first low-E coating comprises, in order moving away from the substrate: a first layer comprising silicon oxynitride having an index of refraction of 1.5-2.1 and being 50-90 nm thick, a layer comprising ITO having an index of refraction of 1.7-2.1 and being 85-125 nm thick, and a second layer comprising silicon oxynitride having an index of refraction of 1.5-2.1 and being 50-90 nm thick. The second low-E coating comprises, in order moving away from the substrate: a first silicon-based layer, a first dielectric layer, a second dielectric layer split by a third dielectric layer so as to form first and second portions of the second dielectric layer, the third dielectric layer comprising either titanium oxide or tin oxide, a metallic or substantially metallic infrared (IR) reflecting layer over and directly contacting the second portion of the second dielectric layer, an upper contact layer comprising an oxide of Ni and/or Cr directly over and contacting the IR reflecting layer, a fourth dielectric layer, and a second silicon-based layer.

In certain example embodiments, a method of making an insulating glass unit (IGU) is provided. A first glass substrate is provided. A first low-E coating is disposed, directly or indirectly, on a first major surface of the first glass substrate. The first low-E coating comprises a plurality of thin film layers including, in order moving away from the first glass substrate: a first layer comprising silicon oxynitride, a layer comprising ITO, and a second layer comprising silicon oxynitride. A second glass substrate is provided in substantially parallel, spaced apart relation to the first glass substrate such that the first major surface of the first glass substrate faces away from the second glass substrate. The first substrate with only the first low-E coating thereon has a hemispherical emissivity of less than or equal to about 0.20 and a sheet resistance less than or equal to about 20 ohms/square following heat treatment. The first major surface of the first glass substrate corresponds to an interior surface of the IGU.

In addition to the features of the previous paragraph, in certain example embodiments, a second low-E coating may be disposed, directly or indirectly, on a second major surface of the first glass substrate opposite to the first second major surface of the first glass substrate. The second low-E coating may comprise a plurality of thin film layers including, in order moving away from the first glass substrate: a first silicon-based layer; a first dielectric layer; a second dielectric layer split by a third dielectric layer so as to form first and second portions of the second dielectric layer, the third dielectric layer comprising either titanium oxide or tin oxide; a metallic or substantially metallic infrared (IR) reflecting layer over and directly contacting the second portion of the second dielectric layer; an upper contact layer comprising an oxide of Ni and/or Cr directly over and contacting the IR reflecting layer; a fourth dielectric layer; and a second silicon-based layer.

In addition to the features of the previous paragraph, in certain example embodiments, the first dielectric layer may be a high refractive index layer comprising an oxide or suboxide of titanium.

In addition to the features of either of the two prior paragraphs, in certain example embodiments, the third and fourth dielectric layers may comprise tin oxide.

In addition to the features of the previous paragraph, in certain example embodiments, the second dielectric layer may comprise zinc oxide.

In addition to the features of the previous paragraph, in certain example embodiments, the second layer may be split such that the parts thereof have thicknesses that vary by no more than 5% of one another.

In addition to the features of any of the previous five paragraphs, in certain example embodiments, the first and second silicon-based layers may each comprise silicon nitride, the first dielectric layer may comprise titanium oxide, the second dielectric layer may comprise zinc oxide, the third and fourth dielectric layers may each comprise tin oxide, and the IR reflecting layer may comprise Ag.

In addition to the features of any of the previous six paragraphs, in certain example embodiments, the first substrate may be heat treated with the first and/or second low-E coatings disposed thereon.

In addition to the features of any of the previous seven paragraphs, in certain example embodiments, the second low-E coating may have a SHGC sufficient to bring the U-value of the IG unit to less than or equal to 0.30.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An insulating glass (IG) unit, comprising:
    first and second substantially parallel spaced apart glass substrates, the first and second substrates providing, in order, first through fourth substantially parallel major surfaces of the IG unit, a gap being defined between the first and second substrates;
    wherein a fourth surface of the IG unit supports a first low-E coating comprising a plurality of thin film layers including, in order moving away from the second substrate:
        a first layer comprising silicon oxynitride having an index of refraction of 1.5-2.1 and being 50-90 nm thick,
        a layer comprising ITO having an index of refraction of 1.7-2.1 and being 85-125 nm thick, and
        a second layer comprising silicon oxynitride having an index of refraction of 1.5-2.1 and being 50-90 nm thick.

2. The IG unit of claim 1, wherein the first and second layer comprising silicon oxynitride have indices of refraction of 1.7-1.8.

3. The IG unit of claim 2, wherein the layer comprising ITO has an index of refraction of 1.8-1.93.

4. The IG unit of claim 1, wherein the layer comprising ITO has an index of refraction of 1.8-1.93.

5. The IG unit of claim 1, wherein the first and second layers comprising silicon oxynitride have indices of refraction and thicknesses that vary from one another by no more than 0.1 and 10 nm, respectively.

6. The IG unit of claim 1, wherein the third surface of the IG unit supports a second low-E coating comprising a plurality of thin film layers including, in order moving away from the second substrate:
    a first silicon-based layer;
    a first dielectric layer;
    a second dielectric layer split by a third dielectric layer so as to form first and second portions of the second dielectric layer;
    a metallic or substantially metallic infrared (IR) reflecting layer over and directly contacting the second portion of the second dielectric layer;
    an upper contact layer comprising an oxide of Ni and/or Cr directly over and contacting the IR reflecting layer;
    a fourth dielectric layer; and
    a second silicon-based layer,
    wherein the third dielectric layer comprises either titanium oxide or tin oxide.

7. The IG unit of claim 6, wherein the first dielectric layer is a high refractive index layer comprising an oxide or suboxide of titanium.

8. The IG unit of claim 6, wherein the third and fourth dielectric layers comprise tin oxide.

9. The IG unit of claim 8, wherein the second dielectric layer comprises zinc oxide.

10. The IG unit of claim 9, wherein the second layer is split such that the parts thereof have thicknesses that vary by no more than 5% of one another.

11. The IG unit of claim 6, wherein the first and second silicon-based layers each comprise silicon nitride, the first dielectric layer comprises titanium oxide, the second dielectric layer comprises zinc oxide, the third and fourth dielectric layers each comprise tin oxide, and the IR reflecting layer comprises Ag.

12. The IG unit of claim 6, wherein the second substrate is heat treated with the first and/or second low-E coatings disposed thereon.

13. The IG unit of claim 6, wherein the second low-E coating has a SHGC sufficient to bring the U-value of the IG unit to less than or equal to 0.30.

14. A coated article comprising a substrate supporting first and second low-E coatings on opposing major surfaces thereof, respectively, wherein:
    the first low-E coating comprises, in order moving away from the substrate:
        a first layer comprising silicon oxynitride having an index of refraction of 1.5-2.1 and being 50-90 nm thick,
        a layer comprising ITO having an index of refraction of 1.7-2.1 and being 85-125 nm thick, and
        a second layer comprising silicon oxynitride having an index of refraction of 1.5-2.1 and being 50-90 nm thick; and
    the second low-E coating comprises, in order moving away from the substrate:
        a first silicon-based layer,
        a first dielectric layer,
        a second dielectric layer split by a third dielectric layer so as to form first and second portions of the second dielectric layer, the third dielectric layer comprising either titanium oxide or tin oxide,
        a metallic or substantially metallic infrared (IR) reflecting layer over and directly contacting the second portion of the second dielectric layer,
        an upper contact layer comprising an oxide of Ni and/or Cr directly over and contacting the IR reflecting layer,
        a fourth dielectric layer, and
        a second silicon-based layer.

* * * * *